United States Patent [19]

Kasai

[11] 4,281,625

[45] Aug. 4, 1981

[54] AUTOMATIC WATER SUPPLY DEVICE

[76] Inventor: Nobuharu Kasai, 32, Azaipponyanagi, Ooazahinuma, Onoecho, Minamitsugaru-gun, Aomori-ken, Japan

[21] Appl. No.: 84,432

[22] Filed: Oct. 12, 1979

[30] Foreign Application Priority Data

Oct. 24, 1978 [JP] Japan .................. 53-130738

[51] Int. Cl.³ ................ A01K 7/00; A01K 39/026
[52] U.S. Cl. .................................. 119/77; 137/132
[58] Field of Search ..................... 119/73, 74, 77; 137/132, 135, 151

[56] References Cited

U.S. PATENT DOCUMENTS

| 1,090,885 | 3/1914 | Shanks | 137/132 X |
| 2,623,500 | 12/1952 | Riley et al. | 119/77 X |
| 2,719,509 | 10/1955 | Kitson | 119/78 X |

FOREIGN PATENT DOCUMENTS 468188 12/1951 Italy ........................ 137/132

Primary Examiner—Gene Mancene
Assistant Examiner—Robert P. Swiatek
Attorney, Agent, or Firm—Birch, Stewart, Kolasch & Birch

[57] ABSTRACT

An automatic water supply device for animals or plants, which uses a siphon tube for transferring a batch of water from a vessel having a float-valve type water inlet control device to a tray. The water transferring operation of the siphon tube is triggered by the water head applied to the siphon's outlet end and by the water received in the tray being reduced by a predetermined amount due to reduction of water level in the tray. The inlet tube portion of the siphon tube located in the internal space of the vessel has a diverged open end having an opening area which is substantially larger than that of the outlet tube portion of the siphon tube.

11 Claims, 10 Drawing Figures

FIG. 5a
FIG. 5b
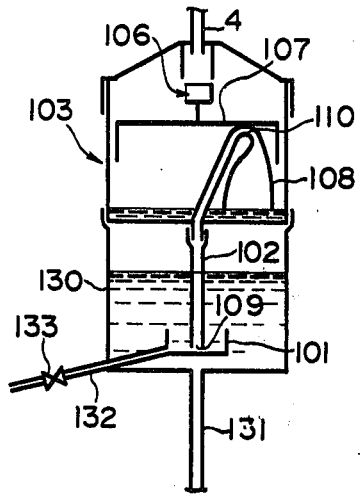
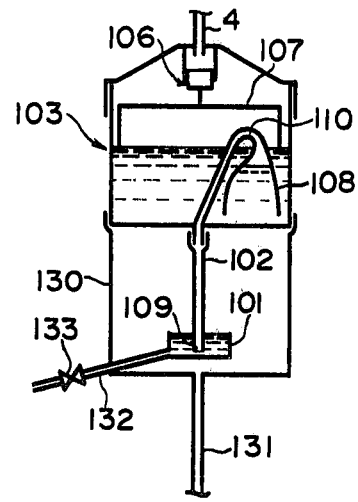
FIG. 6
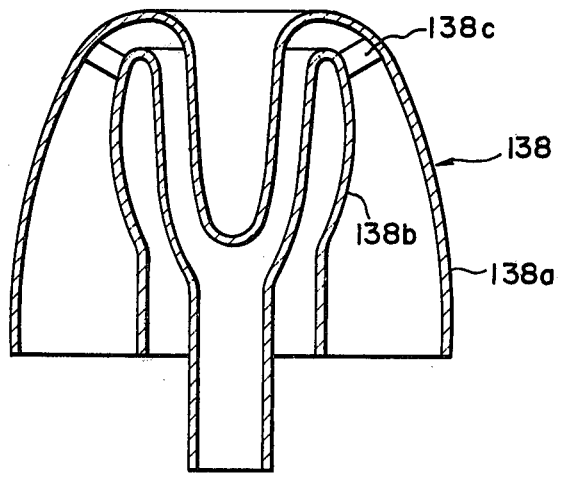

AUTOMATIC WATER SUPPLY DEVICE

BACKGROUND OF THE INVENTION

The present invention relates to an automatic water supply device for animal drinking and for sprinkling in gardening or horticulture, and more particularly, to an improved automatic water supply device which utilizes siphon action and which supplies water at long-timed intervals in response to lowering of water level in the water tray down to a predetermined level.

In most of the prior art automatic water supply devices or systems for animal drinking, a water supply control means such as a valve, ball tap or the like are usually arranged within or adjacent to a water feeding tray or vessel so that said valve, etc., is actuated when it is touched and moved by the mouth or nose of an animal wishing to drink water.

Therefore, malfunction of this kind of device frequently occurs due to unnecessary engagement of the animal's mouth or nose with such a water supply control means by mere mischief, etc., thereby causing overflow of water on the floor of animal's enclosure without being effectively consumed by the animals, and further making the floor wet and dirty.

Further, with respect to the conventional water supply devices, the water control device such as a valve, etc., is soon damaged by corrosion, and the water tray becomes undesirably large in order to receive the control device therein.

In view of the abovementioned drawbacks, I have proposed an automatic water supply device utilizes a siphon means, in Japanese Patent Application No. 37062/77 filed on Mar. 31, 1977 (Japanese Laying Open Publication No. 122570/78) and in the corresponding U.S. Pat. application Ser. No. 891,172 filed on Mar. 29, 1978, now U.S. Pat. No. 4,202,294, issued May 13, 1980.

The inventor's abovementioned prior invention has solved most of the drawbacks of the conventional devices. However, it has been found that some matters should still be improved with respect to its siphon action.

In the device of the inventor's prior invention, if the size and the arrangement of the inversely J-shaped siphon tube are not proper, water droplets remain in the passage of the siphon tube after the end of the siphoning operation in a manner such that some of the water droplets block an intermediate portion of the passage of the siphon tube, while additional droplets are suspended in the inlet tube portion extending from the top portion of the inversely J-shape siphon tube toward its open inlet end. If this happens, when water is poured into the flow control container for the next siphoning supply of water, the water level in the inlet tube portion of the siphon tube may rise in advance of the water level outside of the siphon tube, and due to this discrepancy between the water levels inside and outside of the siphon tube, the siphoning operation may be inadvertently triggered at an early stage before the container has been filled with a predetermined amount of water.

This sucking up of water is likely to be accompanied by a small amount of dregs of animal food. The water and dregs are raised, gradually by repetition, through the water feed pipe (the long leg of the siphon) until they finally enter into the flow control container, thereby producing dirty water in the flow control container. Although this contamination is sometimes negligible, it is still desirable that it should be definitely avoided.

SUMMARY OF THE INVENTION

An object of the present invention is to provide a novel water supply device having siphon means which has more exact starting-up characteristics and yet is free from sucking up any dirty material contained in the water tray at the termination of the water supply action.

Another object of the present invention is to provide an improved automatic water supply device which sprinkles water in gardening or horticulture at predetermined intervals.

According to one aspect of the present invention, the flow control device comprises an improved siphon means of a particular structure having an enlarged short leg portion acting as an inlet tube, a long leg portion acting as an outlet tube and a water feed pipe, and a flat and thin top portion connecting said short and long leg portions, wherein the short leg portion has an inlet opening area which is several times as large as the cross section of the long leg portion.

By virtue of this particular configuration, upon the completion of feeding of water by siphon action, the inside of the siphon means is entirely occupied by air without permitting any amount of water to remain therein. This ensures repetition of exact and steady siphon action which takes place whenever the water level in a self-supply water tray falls down to a predetermined level due to an animal's drinking or natural evaporation.

According to another aspect of the present invention, a water tray is received in an outer closure can body attached immediately below a water flow control container which receives a siphon means therein, and the tray is provided with an adjustable cock which acts to discharge water from the tray at a predetermined rate, thereby permitting siphon action to take place at predetermined intervals.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIGS. 5a and 5b are diagrammatical sectional views showing operation of the automatic water supply device shown in FIG. 4; and, FIG. 6 is a vertical sectional view showing a modification of the siphon tube.

DESCRIPTION OF THE PREFERRED EMBODIMENTS

Figure 1:
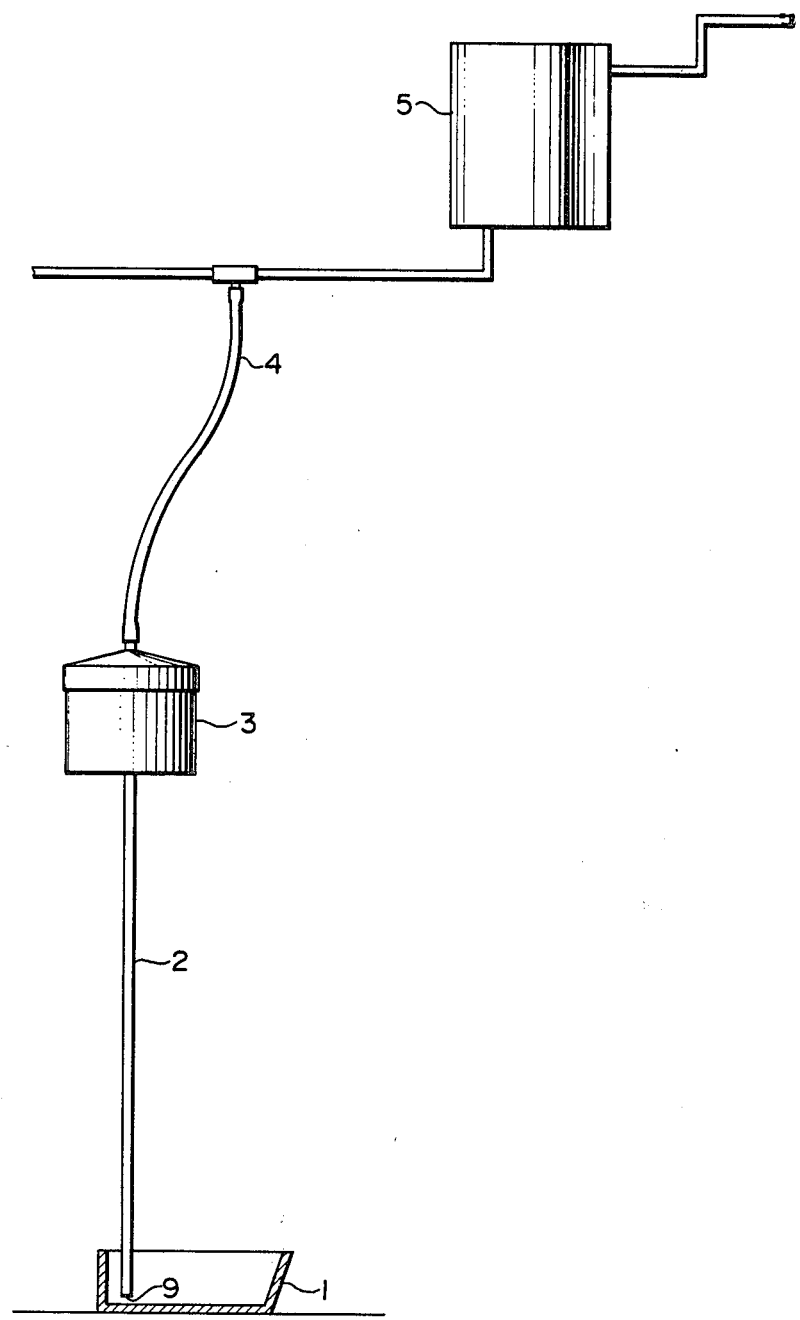
FIG. 1 is a partially cross-sectional front view showing a first embodiment of the present invention, constructed as an automatic water supply device for use in raising domestic animals.

Referring now to FIG. 1 showing an automatic water supply device for raising domestic animals, a self-supply water tray or trough 1 has a pan-shape in which a water feed pipe 2 is positioned so that its outlet opening 9 is located at a suitable height from the bottom of the tray 1, depending upon the quantity of water to be stored therein.

A water flow control container 3 is provided at the top end of the water feed pipe 2, said container being further connected through a water supply pipe 4 to a water storage tank or cistern 5, which is placed above the control container.

Figure 2:
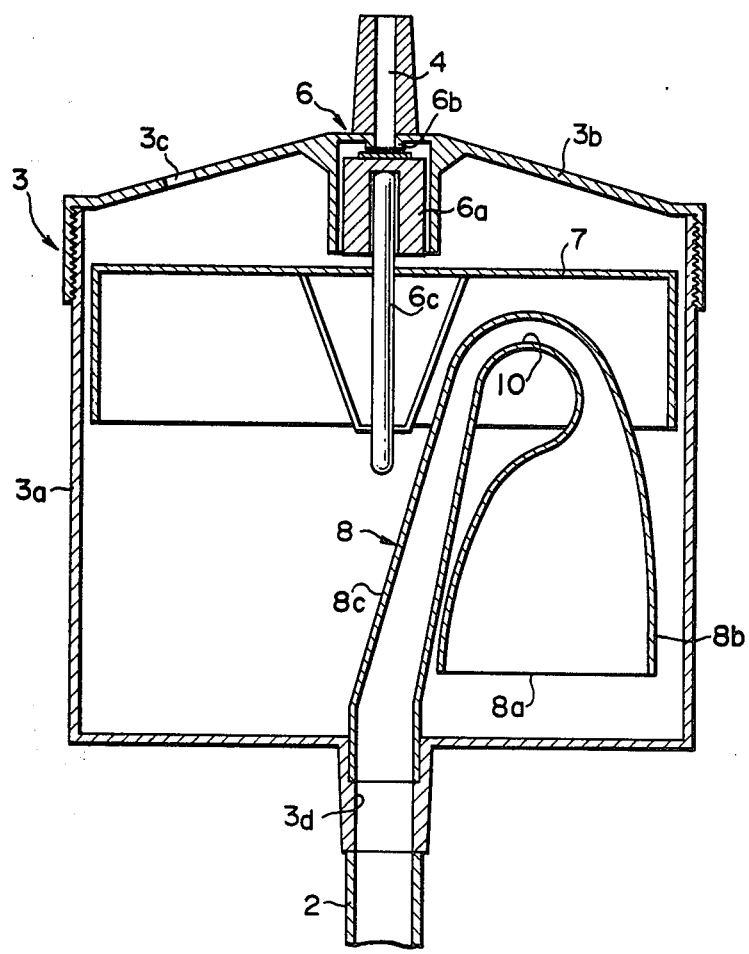
FIG. 2 is a vertical sectional view of the water flow control container incorporated in the automatic water supply device shown in FIG. 1.

As shown in FIG. 2, the water flow control container 3 has a cylindrical container body or vessel 3a having an open upper end and a closed bottom, and a cylindrical cap-like cover 3b closes said open upper end of the body. The cover 3b is threadedly connected with the body 3a.

In an upper half portion of the container body 3a, an inverted pan-shape float can 7 having a size adapted for the inside space of the container is arranged so as to be movable up and down, depending upon the level of water in the container body 3a.

A valve 6 having a valve body 6a, a valve stem 6c fixed to the center of said float can 7, and a valve seat 6b provided at the center of the lower face of the cover 3b, is incorporated at the top of the container, so as to control the supply of water through the valve 6 in accordance with up and down movement of the float can 7.

A small vent hole 3c is formed through the cover 3b, so as to prevent the inside of the container from becoming evacuated.

A siphon tube 8 of substantially inverted J-shape configuration is provided inside the water flow control container 3, said siphon tube being connected at its lower end to an outlet opening 3d formed at the bottom of the container, said opening being further connected to the water feed pipe 2. Inlet tube portion 8b of the siphon tube is placed inside the container 3 in such a manner that its enlarged inlet opening 8a is located so as to be somewhat elevated from the bottom of the container, while the top portion 10 of the siphon tube is formed into a flat and thin shape having a horizontally elongated flat oval cross section, which projects upward so as to enter into the inside of the float can 7.

Outlet tube portion 8c of the siphon tube 8 is formed as a constant or slightly diverging tube portion extending from the flat thin top portion 10 toward its lower end.

The inlet tube portion 8b of the siphon tube is formed to have a circular, oval or polygonal cross section which is considerably increased from the top portion 10 toward its inlet opening 8a in such a manner that the cross sectional area of the inlet opening 8a is several times, e.g. 4-7 times as large as that of the outlet opening portion 8c. Further, in order to prevent any droplets from remaining in the siphon tube outlet portion 8c, the outlet portion should be equivalent to a circular tube having a diameter of approximately 10 mm.

The ratio of the cross sectional area of the inlet tube portion to that of the outlet tube portion must be determined depending upon the amount of water to be supplied through the siphon tube, and by the necessity to avoid sucking up water upon the completion of siphon action. However, this ratio is not very strict and may be changed in a relatively wide range.

The operation of the automatic water supply system shown in FIGS. 1 and 2 will now be explained by referring to FIGS. 3a–3d.

Starting from the state where there is no water in the flow control container 3, when water is supplied to the container 3 through the water supply branch pipe 4, the level of water in the container gradually increases. In the state shown in FIG. 3a, the float can 7 is still at its lowest position, permitted by a mechanical stop (not shown in the figure), wherein the valve 6 is still opened.

Figure 3D:
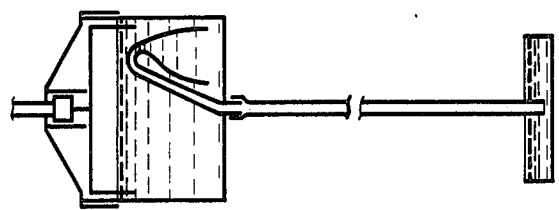
FIGS. 3a–3d are diagrammatical views showing operation of the automatic water supply device shown in FIGS. 1 and 2.
Figure 3C:
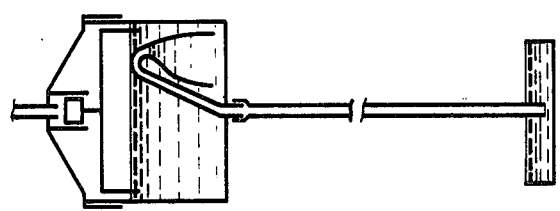
Figure 3B:
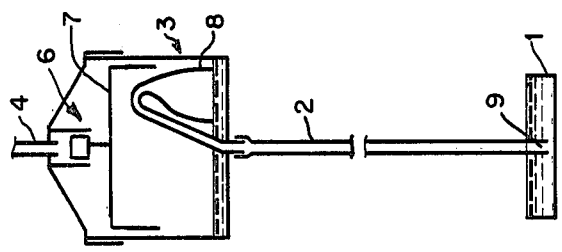
Figure 3A:
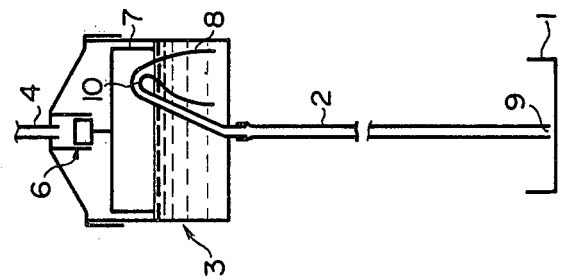

When the water level in the container 3 reaches the top portion 10 of the siphon tube 8, the water stored in the container 3 begins to flow out by siphon action through the water feed pipe 2 into the self-supply water tray 1, and is stored therein for animals to drink, as shown in FIG. 3b.

When the water level in the container 3 falls below the enlarged inlet opening 8a due to the siphon action, air in the container 3 enters into the interior of the siphon tube 8, and thus the siphon action is lost and the flow of water stops.

During the above process, the valve 6 is kept open, and therefore the level of water in the container 3 again begins to rise up after the flow of water due to the fact that the siphon action has stopped. During this second time, however, since the outlet opening 9 of the water feed pipe 2 is closed by the water contained in the tray 1, the siphon action for transferring water from the container 3 to the tray 1 is performed in a manner somewhat different from that explained above.

Let us assume that the amount of water supplied by the initial siphon action is adjusted to provide a water level in the tray 1, which is, for example, 15 mm higher than the level of the outlet opening 9. As water is further supplied to the container 3, both the water level in the space of the container 3 outside the siphon tube 8 and that in the siphon tube inlet portion 8b increases. In this case, however, since the outlet opening 9 of the pipe 2 is closed by water and air is entrapped in the space of the siphon tube 8 and the pipe 2, the water level in the siphon tube inlet portion 8b does not substantially rise up until the water level in the container space outside the siphon tube becomes 15 mm higher than that in the siphon tube inlet portion 8b. Thereafter, both water levels rise up together, with the 15 mm level difference being maintained, while part of the air entrapped in the siphon tube 8 and the pipe 2 is gradually blown out from the outlet opening 9 in the form of bubbles. Therefore, when the water level in the container space outside the siphon tube reaches the top portion 10 of the siphon tube, the water level in the siphon tube inlet portion 8b is still at the level which is 15 mm lower than said top portion 10 as shown in FIG. 3c.

Therefore, in other words, the water level in the siphon tube inlet portion 8b will not rise up to the top of the siphon tube until the level of the water outside the siphon tube rises 15 mm above the top of the siphon tube.

In this connection, the top portion 10 of the siphon tube if formed to have a horizontally elongated flat and thin cross section, such as a relatively flat oval section, and therefore, resistance to water flow effected by the top portion 10 is relatively large. This stably withholds water from flowing over the top portion 10 until the water level outside the siphon tube reaches exactly a predetermined height.

Now, as shown in FIG. 3d, the water flow control container 3 is so adapted that, before the water level in the container space outside the siphon tube reaches such a predetermined height that is 15 mm higher than the top portion 10 of the siphon tube, the valve body 6a is pressed against the valve seat 6b by the action of the float can 7, so as to stop the supply of water through the pipe 4, whereby the whole system is brought to a temporary pause.

Then, as the water level in the tray 1 gradually lowers due to water drinking by animals and/or natural evaporation of water, the head difference formed between the water level in the tray 1 and the outlet opening 9 gradually decreases, thereby correspondingly reducing the head difference between the water level in the container space outside the siphon tube and that in the siphon tube inlet portion 8b, so that the water level in the siphon tube inlet portion gradually rises up, until it finally exceeds the top portion 10 of the siphon tube. At this instant, the siphon action takes place so as to rapidly discharge a predetermined amount of water from the control container 3 to the water tray 1 through the siphon tube 8 and the water feed pipe 2, thus reverting the state of the water flow control container 3 back to that shown in FIG. 3b.

The height of the water level in the control container 3 which starts the siphon action may be adjusted by turning the threadedly engaged cover 3b relative to the container body 3a.

It is to be noted that, if some amount of water remains within the siphon tube 8 and the water feed pipe 2, starting of siphon action becomes unsteady and somtimes causes intermittent drop-like flows.

In order to avoid such undesirable flow of water, the inlet tube portion 8b of the siphon tube 8 is, as explained above, formed to diverge toward an enlarged inlet opening having a cross section which is 4-7 times as large as that of the outlet pipe portion 8c, thereby facilitating complete outflow of water from the siphon tube, so that the interior of the siphon tube is entirely filled with only air upon the completion of the siphon action.

Figure 4:
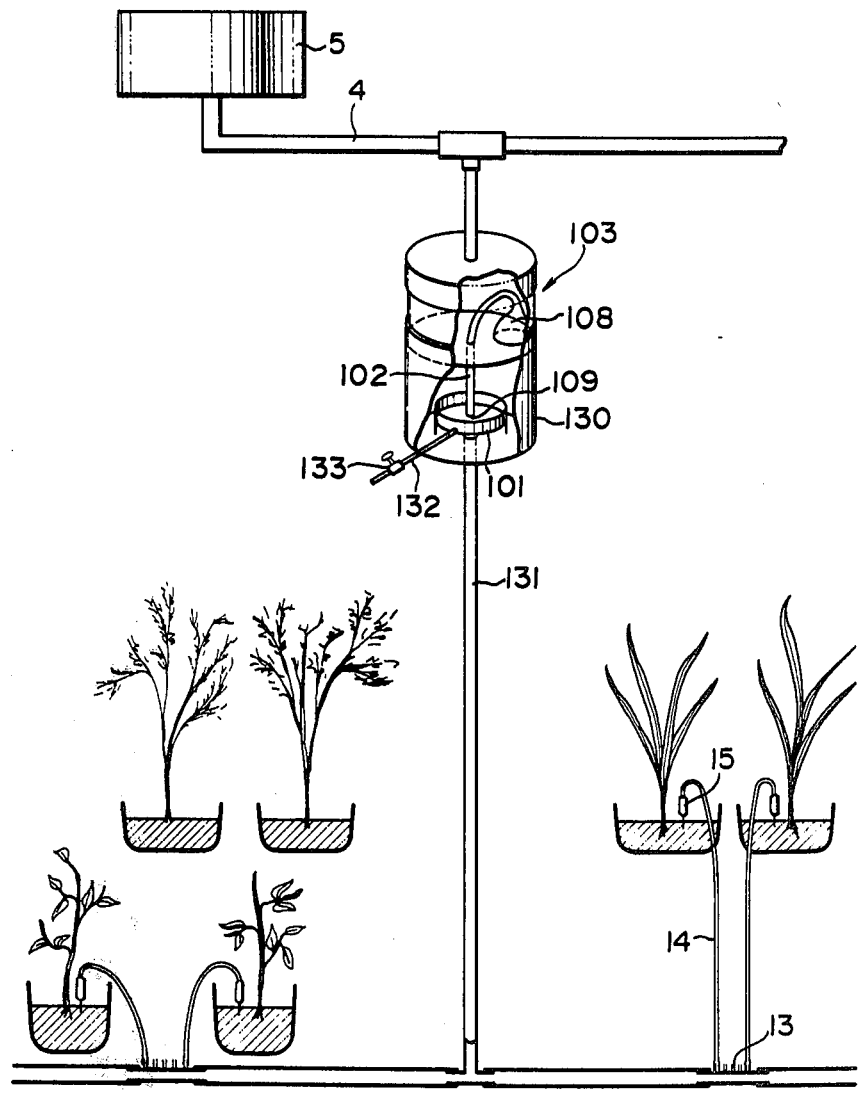
FIG. 4 is a partially perspective diagrammatical view of a second embodiment of the present invention, constructed as an automatic water supply device for horticulture.

FIG. 4 shows a second embodiment of the present invention constructed as an automatic water supply device applicable for sprinkling in horticulture. In this embodiment, a water tray 101, which corresponds to the self-supplying water tray 1 in the first embodiment, is provided within a vessel 130 which is attached to the bottom of the water flow control container 103, which is similar to the water flow control container 3 in the first embodiment.

The structure of the container 103 is similar to that of the container 3 in the first embodiment, and therefore the portions in the container 103 corresponding to those in the container 3 are designated by reference numerals which correspond to those used in the container 3 but are increased by the number 100, and detailed explanations about these portions will be omitted in order to avoid repetition of explanation.

A hose 131 is connected to an opening formed at the central portion of the closed bottom of the vessel 130, so as to extend downward therefrom and to be branched into several branch hoses, which, combined with pieces having taps 13, provide sprinkler systems, wherein each sprinkler 15 is supplied with water through a vinyl tube 14 connected to the tap. The sprinkler 15 is of a well known type which has a body having a plurality of small holes and a cap slidable along the body so as to adjust the amount of water to be sprinkled therethrough.

A drain pipe 132 including an adjustable cock 133 is connected to the bottom portion of the water tray 101 so as to drain the water tray at a predetermined rate.

Operation of the automatic water supply device shown in FIG. 4 will now be explained by referring FIGS. 5a and 5b. In this connection, however, operation of the water flow control container 103 is substantially the same as that of the container 3 in the first embodiment. Therefore, in order to avoid repeated explanations, operation of the container 103 will be ommitted.

When the siphon action is triggered, the water stored in the container 103 is discharged into the vessel 130 as shown in FIG. 5a. This water virtually flows out through the pipe 131 so as to be supplied to the plants through the sprinkler systems. However, the water tray 101 remains filled with water even after the vessel 130 has been drained through the pipe 131, as shown in FIG. 5b. The water contained in the water tray 101 is then discharged at a predetermined small rate through the drain pipe 132 including the cock 133. This draining process corresponds to animal's water drinking and/or natural evaporation of water in the first embodiment, although in the second embodiment the time required for draining the water tray 101 so as to trigger the next siphon action is primarily determined by adjustment of the cock 133.

FIG. 6 shows a modification of the siphon tube to be incorporated into the automatic water supply device of the present invention. In this modification, the siphon tube 138 has a configuration which shows a longitudinal section like a mushroom, including outer and inner members 138a and 138b. These two members are connected with each other yet spaced from each other by spacer members 138c. This modification facilitates both fabrication of the siphon tube and its mounting inside a reduced size flow control container.

Although the invention has been shown and described with respect to some preferred embodiments thereof, it should be understood that various changes and omissions of the form and details thereof may be made therein by one skilled in the art without departing from the scope of the invention.

I claim:
1. An automatic water supply device comprising:
   a tray adapted to receive water up to a predetermined first level;
   a first vessel having a float and valve assembly which controls supply of water into said first vessel so as to maintain a predetermined highest second level of water in said first vessel; and
   a siphon tube having a highest point, an inlet tube portion which extends downwardly from the highest point and has an open inlet end which has a substantially horizontally disposed annular edge which defines an inlet opening area and is located in said first vessel at a predetermined third level which is lower than said second level, and an outlet tube portion which extends downwardly from the highest point and has an open outlet end which has an outlet opening area and is located in said tray at a predetermined fourth level which is lower than said first level, said inlet opening area of said siphon tube being substantially larger than said outlet opening area;

wherein the highest point of the siphon tube is positioned between said second level and a level which is lower than said second level by the difference between said first and fourth levels.

2. The device of claim 1 wherein the inlet opening area of said open inlet end of said inlet tube portion of said siphon tube is 4 to 7 times as large as the outlet opening area of said outlet tube portion of said siphon tube.

3. The device of claim 1, wherein the highest point of said siphon tube has a horizontally elongated cross sectional area.

4. The device of claim 1, wherein said tray is a self-supply water tray for animals from which the animals drink water directly.

5. The device of claim 1, further comprising a second vessel adapted to receive water discharged from said first vessel, wherein said water tray is positioned in said second vessel and has a controlled draining means which drains water contained in the water tray at a controlled rate.

6. The device of claim 5, further comprising a water sprinkling system connected to said second vessel so as to be supplied with water therefrom.

7. The device of any one of claims 1–6, wherein said outlet tube portion of said siphon tube includes a first portion which is located substantially in said first vessel and a second portion which is located outside said first vessel and being axially connected with each other.

8. The device of any one of claims 1–6, wherein said annular edge of said open end of said inlet tube portion of said siphon tube is arranged around said outlet tube portion of said siphon tube.

9. The device of claim 1, wherein said substantially horizontally disposed annular edge has a longitudinal sectional mushroom configuration wherein the annular edge extends around the siphon tube.

10. The device of claim 9, wherein said mushroom configuration is formed by an inner member which is a portion of said siphon tube and an outer member which is spaced from said inner member.

11. The device of claim 1, wherein water is supplied to said first vessel through a conduit in an upper portion of said first vessel, said valve including a valve body mounted on a valve stem affixed to said float, and said valve closing said conduit in said upper portion of said first vessel when said water reaches said predetermined highest second level.

* * * * *